US008516581B2

(12) United States Patent
Hsu et al.

(10) Patent No.: US 8,516,581 B2
(45) Date of Patent: Aug. 20, 2013

(54) PHISHING PROCESSING METHOD AND SYSTEM AND COMPUTER READABLE STORAGE MEDIUM APPLYING THE METHOD

(75) Inventors: Fu-Hau Hsu, Taichung (TW); Shih-Jen Chen, Tuchen (TW); Chien-Ting Kuo, Taichung (TW); Jain-Shing Wu, Taipei (TW); Chuan-Sheng Wang, Taipei (TW)

(73) Assignee: Institute for Information Industry, Taipei (TW)

( * ) Notice: Subject to any disclaimer, the term of this patent is extended or adjusted under 35 U.S.C. 154(b) by 21 days.

(21) Appl. No.: 13/323,863

(22) Filed: Dec. 13, 2011

(65) Prior Publication Data

US 2013/0145462 A1  Jun. 6, 2013

(30) Foreign Application Priority Data

Dec. 2, 2011  (TW) .............................. 100144371 A

(51) Int. Cl.
*G06F 11/00* (2006.01)
*G06F 11/30* (2006.01)
*H04L 29/06* (2006.01)

(52) U.S. Cl.
USPC ................. 726/22; 726/23; 726/24; 713/154; 713/188

(58) Field of Classification Search
USPC .......................................................... 726/22
See application file for complete search history.

(56) References Cited

U.S. PATENT DOCUMENTS

| 7,620,690 | B1* | 11/2009 | Castelli .......................... 709/206 |
| 2004/0078422 | A1* | 4/2004 | Toomey ......................... 709/202 |
| 2005/0086161 | A1 | 4/2005 | Gallant |
| 2006/0075491 | A1* | 4/2006 | Lyon ................................ 726/22 |
| 2007/0107053 | A1* | 5/2007 | Shraim et al. .................... 726/22 |
| 2007/0192855 | A1* | 8/2007 | Hulten et al. .................... 726/22 |
| 2011/0126289 | A1* | 5/2011 | Yue et al. ......................... 726/26 |
| 2011/0302656 | A1* | 12/2011 | El-Moussa ...................... 726/24 |

FOREIGN PATENT DOCUMENTS

WO  2005/048522 A1  5/2005

OTHER PUBLICATIONS

English translation of abstract of WO 2005/048522 A1.

* cited by examiner

*Primary Examiner* — Andrew L Nalven
*Assistant Examiner* — Khang Do
(74) *Attorney, Agent, or Firm* — McClure, Qualey & Rodack, LLP

(57) ABSTRACT

A phishing processing method includes: an information input web page comprising an information input interface, through which information is transmitted to an information receiving address, is received. Determine if the information input web page is a phishing web page. If it is determined that the information input web page is the phishing web page, fake input information is transmitted to the information receiving address. When information for verification is received from an information transmitting address, if the received information for verification is the fake input information is determined. If the received information for verification is the fake input information, it is determined that the information transmitting address is a malicious address.

13 Claims, 2 Drawing Sheets

PHISHING PROCESSING METHOD AND SYSTEM AND COMPUTER READABLE STORAGE MEDIUM APPLYING THE METHOD

RELATED APPLICATIONS

This application claims priority to Taiwan Application Serial Number 100144371, filed Dec. 2, 2011, which is herein incorporated by reference.

BACKGROUND

1. Technical Field

The present invention relates to a phishing processing method and system and a computer-readable storage medium with a computer program to execute the method.

2. Description of Related Art

Phishing is a way of attempting to acquire information such as usernames, passwords, and credit card details by masquerading as a trustworthy entity in an electronic communication. For example, phishing network pages often claims that they are from famous social networking web pages (for example, YouTube®, Facebook®, MySpace®), bidding web pages (for example, Ebay®), network banks, e-commerce web pages (for example, PayPal®), network management web pages (for example, Yahoo®, network service providers, companies, institutions) for users to trust them. Subsequently, users are directed to a web page, which is similar to the web site they claim. Even if authorization utilizing Secure Sockets Layer (SSL) protocol, it is hard to identify if web pages are fake or not.

Most phishing detecting methods utilize black lists to identify if a web page is a phishing page. However, even if such phishing pages can be detected, information stolen by such phishing pages previously may still be masqueraded through pages other than the phishing pages.

SUMMARY

According to one embodiment of this invention a phishing processing method is provided. In the phishing processing method, when fake information, which is transmitted to a phishing web page, is received from an address, the address is taken as a malicious address. The phishing processing method may be implemented as a computer program product, which includes at least one program instruction. The at least one program instruction of the computer program product is used for loading into a computer. After the at least one program instruction of the computer program product is loaded into a computer, the computer executes the steps of the phishing processing method. The phishing processing method includes the following steps:

(a) An information input web page including an information input interface, through which information is transmitted to an information receiving address, is received.

(b) Determine if the information input web page is a phishing web page.

(c) If it is determined that the information input web page is the phishing web page, fake input information is transmitted to the information receiving address.

(d) When information for verification is received from an information transmitting address, determine if the received information for verification is the fake input information.

(e) If the received information for verification is the fake input information, it is determined that the information transmitting address is a malicious address.

According to another embodiment of this invention a phishing processing system is provided. When the phishing processing system receives fake information, which is transmitted to a phishing web page, from an address, it takes the address as a malicious address. The phishing processing system includes a network card and a processing unit, which are electrically connected with each other. The network card builds a connection with a network. The processing unit includes a web-page receiving module, a page determining module, a fake-information transmitting module, an information receiving module and an information determining module. The web-page receiving module receives an information input web page including an information input interface, through which information is transmitted to an information receiving address, through the network. The page determining module determines if the information input web page is a phishing web page. If the page determining module determines that the information input web page is the phishing web page, the fake-information transmitting module transmits fake input information to the information receiving address. The information receiving module receives information for verification from an information transmitting address. The information determining module determines if the received information for verification is the fake input information. If the received information for verification is the fake input information, the information determining module determines that the information transmitting address is a malicious address.

The present invention can achieve many advantages. Malicious addresses can be found out with fake information transmitted to phishing web sites. In one embodiment of this invention, a list of such malicious addresses can be shared to other web servers, which can prevent other web servers from being infringed. In another embodiment of this invention, other information masqueraded by the same malicious address can be aware.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
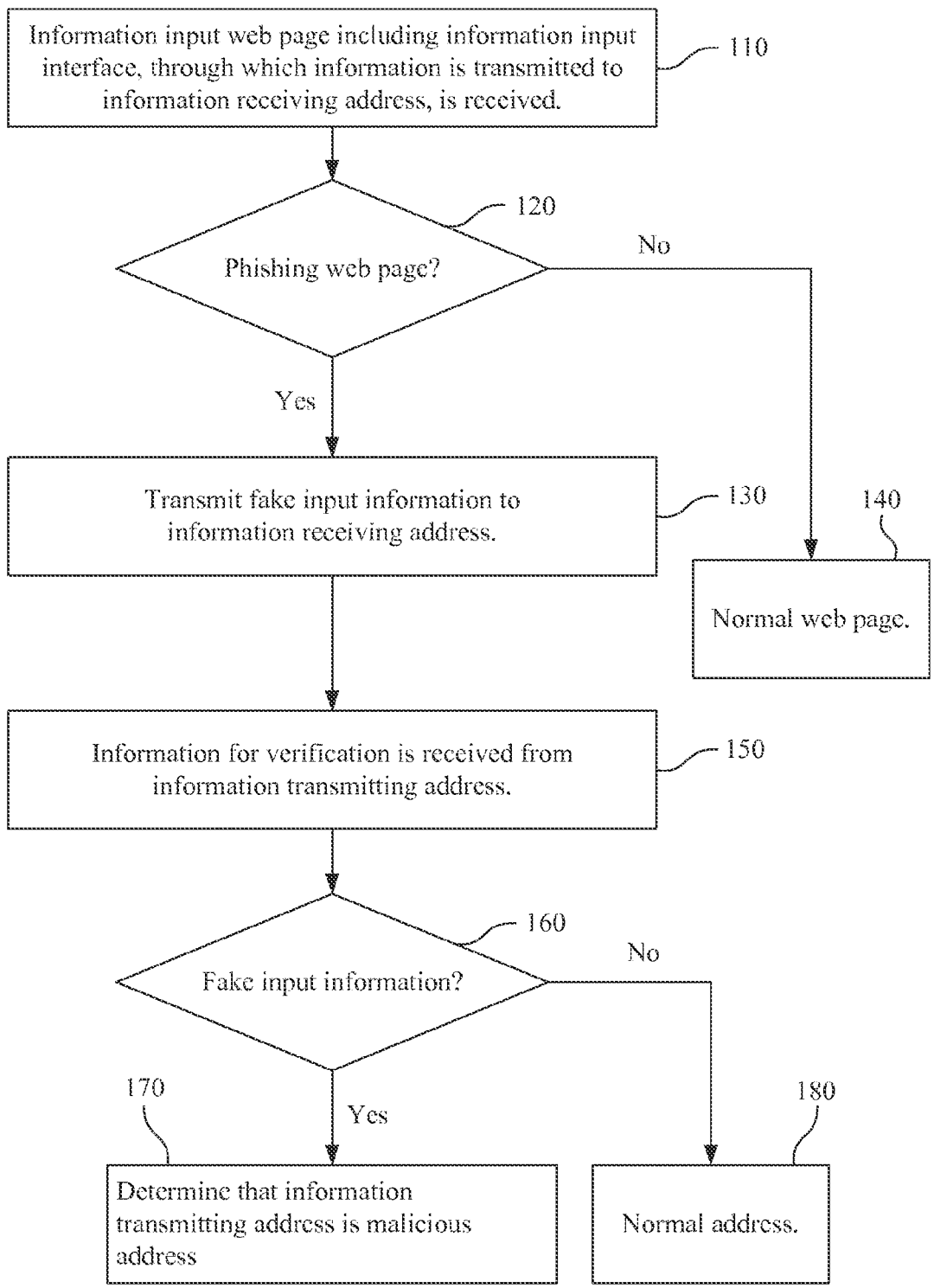
FIG. 1 is a flow diagram of a phishing processing method according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a flow diagram will be described that illustrates a phishing processing method according to one embodiment of this invention. In the phishing processing method, when fake information, which is transmitted to a phishing web page, is received from an address, the address is taken as a malicious address. The phishing processing method may take the form of a computer program product stored on a computer-readable storage medium having computer-readable instructions embodied in the medium. Any suitable storage medium may be used. In some embodiments, such suitable storage medium may be a non-transitory computer readable storage medium including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives. In other embodiments, other suitable storage mediums may be used, which should not be limited in this disclosure.

The phishing processing method includes the following steps:

In step 110, an information input web page including an information input interface, through which information is transmitted to an information receiving address, is received.

In step 120, determine if the information input web page is a phishing web page.

If it is determined that the information input web page is not a phishing web page, the phishing processing method continues from step 120 to step 140, where the information input web page is taken as a normal web page for subsequently processing.

If it is determined that the information input web page is a phishing web page, the phishing processing method continues from step 120 to step 130, where fake input information is transmitted to the information receiving address. Hence, someone, who utilizes such fake input information, may be malicious and related to the information input web page determined as a phishing web page. In addition, a fake address may be generated, and the fake input information may be transmitted with the generated fake address in step 130. Therefore, hosts with fake information transmitting function may not be aware easily according to their addresses.

Subsequently, when information for verification is received from an information transmitting address (step 150), if the received information for verification is the fake input information is determined (step 160).

If the received information for verification is not the fake input information, the phishing processing method continues from step 160 to step 180, where the information transmitting address is taken as a normal address for subsequently processing.

If the received information for verification is the fake input information, the phishing processing method continues from step 160 to step 170, where it is determined that the information transmitting address is a malicious address. In subsequence, an operation for a malicious address can be performed. In one embodiment of this invention, the information transmitting address determined as a malicious address may be recorded in a list and the list may be shared to other web servers, which can prevent other web servers from being infringed. In another embodiment of this invention, when other information for verification is received from the information transmitting address determined as a malicious address, the other information for verification received is determined as stolen information. Therefore, other information masqueraded by the same malicious address can be aware.

In one embodiment of the phishing processing method, an email may be received, and the email may be analyzed to determine if the email includes the information input web page including the information input interface, which can be subsequently received in step 110. Therefore, phishing web pages included in emails can be detected with the method in the present invention. Especially, the method in the present invention is applied to network equipments, such network equipments can process phishing web page in emails forwarded by the same, and can prevent information stolen by phishing web pages from being masqueraded.

In another embodiment of the phishing processing method, several emails may be received. The emails may be analyzed to obtain several content addresses in content of the emails. Subsequently, if there is at least one same domain, which the content addresses are under, may be analyzed. If there is the at least one same domain, which the content addresses are under, a number of the content addresses, which are under the at least one same domain, may be counted. If the number of the counted content addresses is more than a threshold, the at least one same domain is determined as a phishing domain. Hence, the determination in step 120 can be made by determining if an address of the information input web page is under the phishing domain. When the address of the information input web page is under the phishing domain, it is determined that the information input web page is the phishing web page in step 120. Therefore, the phishing processing method of the present invention can be applied to network equipments, and emails transmitted through such network equipments can be processed with the phishing processing method.

In still another embodiment of the phishing processing method, at least one rank value, which corresponds to the information input web page received in step 110, may be inquired (for example, by looking up a ranking web site) according to an address of the information input web page thereof. Hence, the determination in step 120 can be made by determining if the information input web page is the phishing web page according to the at least one rank value corresponding to the same.

In another embodiment of the phishing processing method, a web page request for requesting the information input web page is received from a client. Subsequently, the web page request is transmitted to receive the information input web page (step 110). Hence, if step 140 determines that the information input web page is a normal web page (not a phishing web page), the information input web page is transmitted to the client. Furthermore, if step 120 determines that the information input web page is a phishing web page, the information input web page may be withdrawn or blocked without being transmitted to the client, which can prevent the client from being infringed by phishing attack.

Figure 2:
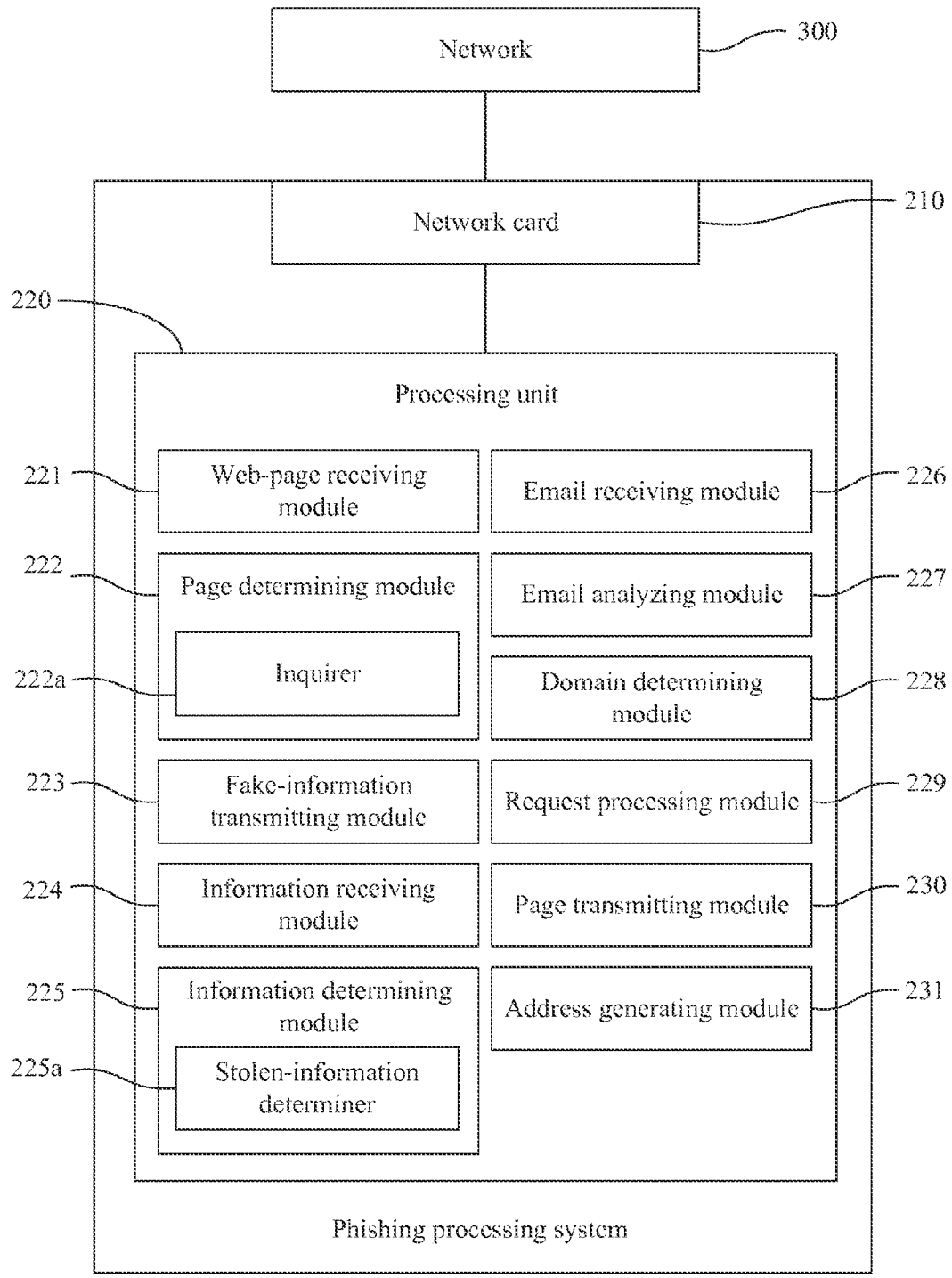
FIG. 2 illustrates a block diagram of a phishing processing system according to an embodiment of this invention.

Referring to FIG. 2, a block diagram will be described that illustrates a phishing processing system according to an embodiment of this invention. When the phishing processing system receives fake information, which is transmitted to a phishing web page, from an address, it takes the address as a malicious address.

The phishing processing system 200 includes a network card 210 and a processing unit 220, which are electrically connected with each other. In one embodiment of this invention, the phishing processing system 200 may be implemented utilizing a same server. In another embodiment of this invention, the phishing processing system 200 can be distributedly implemented with several servers.

The network card 210 builds a connection with a network 300. The processing unit 220 includes a web-page receiving module 221, a page determining module 222, a fake-information transmitting module 223, an information receiving module 224 and an information determining module 225. The web-page receiving module 221 receives an information input web page including an information input interface, through which information is transmitted to an information receiving address, through the network 300.

The page determining module 222 determines if the information input web page is a phishing web page. If the page determining module 222 determines that the information input web page is the phishing web page, the fake-information transmitting module 223 transmits fake input information to the information receiving address through the network 300. Hence, someone, who utilizes such fake input information, may be malicious and related to the information input web page determined as a phishing web page. In addition, the processing unit 220 may further include an address generating module 231 for generating a fake address. In subsequence, the fake-information transmitting module 223 may transmit the fake input information with the generated fake address through the network 300. In some embodiments, the fake address may be an IP address, a MAC address or any other kind of address. Therefore, the address of the phishing processing system 200 may not be aware easily.

The information receiving module 224 receives information for verification from an information transmitting address through the network 300. The information determining module 225 determines if the received information for verification is the fake input information. If the received information for verification is the fake input information, the information determining module 225 determines that the information transmitting address is a malicious address. In subsequence, the phishing processing system 200 may perform an operation for a malicious address. In one embodiment of this invention, the phishing processing system 200 may record the information transmitting address determined as a malicious address in a list and share the list to other web servers, which can prevent other web servers from being infringed. In another embodiment of this invention, when the received information for verification is the fake input information and other information for verification is received from the same information transmitting address through the network 300, a stolen-information determiner 225a of the processing unit 220 determines that the other information for verification is as stolen information. Therefore, other information masqueraded by the same malicious address can be aware.

In one embodiment of this invention, the processing unit 220 may further include an email receiving module 226 and an email analyzing module 227. The email receiving module 226 receives an email through the network 300. The email analyzing module 227 analyzes the email to determine if the email includes the information input web page including the information input interface, which can be subsequently provided to the web-page receiving module 221. Therefore, phishing web pages included in emails can be detected by the phishing processing system 200. Especially, the phishing processing system 200 can process phishing web page in emails forwarded by the same, and can prevent information stolen by phishing web pages from being masqueraded.

In another embodiment of this invention, the email receiving module 226 may receives several emails through the network 300. The email analyzing module 227 may analyze the emails to obtain several content addresses in content of the emails. In subsequence, the email analyzing module 227 may analyze if there is at least one same domain, which the content addresses are under. If there is the at least one same domain, which the content addresses are under, the email analyzing module 227 may count a number of the content addresses, which are under the at least one same domain. If the number of the counted content addresses is more than a threshold, a domain determining module 228 of the processing unit 220 may determines that the at least one same domain is a phishing domain. Hence, the page determining module 222 may determine if an address of the information input web page is under the phishing domain. When the address of the information input web page is under the phishing domain, the page determining module 222 determines that the information input web page is the phishing web page. Therefore, the phishing processing system 200 can be implemented as a network equipment, and emails transmitted through such network equipment can be processed with phishing processing.

In another embodiment of this invention, the page determining module 222 may include an inquirer 222a. The inquirer 222a inquires at least one rank value corresponding to the information input web page according to an address of the information input web page. In some embodiments, the inquirer 222a may connect to a page ranking web site for obtaining the rank value. Subsequently, the page determining module 222 determines if the information input web page is the phishing web page according to the at least one rank value.

In addition, the processing unit 220 may further include a request processing module 229 and a page transmitting module 230. The request processing module 229 may receive an information input web page for requesting the information input web page from a client. Subsequently, the request processing module 229 may transmit the web page request to receive the information input web page for the web-page receiving module 221. Hence, if the page determining module 222 determines that the information input web page is not the phishing web page, the page transmitting module 230 transmits the information input web page to the client. In addition, if the page determining module 222 determines that the information input web page is the phishing web page, the phishing processing system 200 may withdraw or block the information input web page without transmitting to the client, which can prevent the client from being infringed by phishing attack.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A phishing processing method, comprising:
   (a) receiving an information input web page and a plurality of emails, the information input web page comprising an information input interface through which information is transmitted to an information receiving address, and analyzing the emails to obtain a plurality of content addresses and determining which the content addresses are under the same at least one domain, counting a number of the content addresses which are under the same domain and determining the at least one same domain is a phishing domain if the number of the counted content addresses is more than a threshold;
   (b) determining if the information input web page is a phishing web page, wherein the information input web page is the phishing web page if an address of the information input web page is under the phishing domain;

(c) if it is determined that the information input web page is the phishing web page, transmitting fake input information to the information receiving address;

(d) when information for verification is received from an information transmitting address, determining if the received information for verification is the fake input information; and (e) if the received information for verification is the fake input information, determining that the information transmitting address is a malicious address.

2. The phishing processing method of claim 1, wherein step (e) comprises:
when other information for verification is received from the information transmitting address which is determined as the malicious address, determining that the other information for verification is stolen information.

3. The phishing processing method of claim 1, further comprising:
receiving a second email; and
analyzing the second email to determine if the second email comprises the information input web page comprising the information input interface.

4. The phishing processing method of claim 1, wherein step (b) further comprises:
inquiring at least one rank value corresponding to the information input web page according to an address of the information input web page; and
determining if the information input web page is the phishing web page according to the at least one rank value.

5. The phishing processing method of claim 1, further comprising:
receiving a web page request for requesting the information input web page from a client;
transmitting the web page request to receive the information input web page; and
if it is determined that the information input web page is not the phishing web page, transmitting the information input web page to the client.

6. The phishing processing method of claim 1, further comprising:
generating a fake address, wherein step (c) comprises:
transmitting the fake input information to the information receiving address with the fake address.

7. A phishing processing system, comprising:
a network card for building a connection with a network; and
a processing unit electrically connected with the network card, wherein the processing unit comprises:
a web-page receiving module for receiving an information input web page comprising an information input interface through which information is transmitted to an information receiving address through the network;
a page determining module for determining if the information input web page is a phishing web page;
a fake-information transmitting module for transmitting fake input information to the information receiving address if the page determining module determines that the information input web page is the phishing web page;
an information receiving module for receiving information for verification from an information transmitting address;
an information determining module for determining if the received information for verification is the fake input information, and if the received information for verification is the fake input information, determining that the information transmitting address is a malicious address;
an email receiving module for receiving a plurality of emails through the network;
an email analyzing module for analyzing the emails to obtain a plurality of content addresses in content of the emails, and analyzing if there is at least one same domain which the content addresses are under, and if there is the at least one same domain which the content addresses are under, counting a number of the content addresses which are under the at least one same domain; and
a domain determining module for determining that the at least one same domain is a phishing domain if the number of the counted content addresses is more than a threshold,
wherein the page determining module determines if an address of the information input web page is under the phishing domain, and when the address of the information input web page is under the phishing domain, the page determining module determines that the information input web page is the phishing web page.

8. The phishing processing system of claim 7, wherein the information determining module comprises:
a stolen-information determiner for determining that other information for verification is stolen information when the received information for verification is the fake input information and the other information for verification is received from the information transmitting address through the network.

9. The phishing processing system of claim 7, wherein:
the email receiving module further receives a second email through the network; and
the email analyzing module further analyzes the second email to determine if the second email comprises the information input web page comprising the information input interface.

10. The phishing processing system of claim 7, wherein the page determining module comprises:
an inquirer for inquiring at least one rank value corresponding to the information input web page according to an address of the information input web page, wherein the page determining module determines if the information input web page is the phishing web page according to the at least one rank value.

11. The phishing processing system of claim 7, wherein the processing unit further comprises:
a request processing module for transmitting a web page request for requesting the information input web page to receive the information input web page when the web page request is received from a client; and
a page transmitting module for transmitting the information input web page to the client if it is determined that the information input web page is not the phishing web page.

12. The phishing processing system of claim 7, wherein the processing unit further comprises:
an address generating module for generating a fake address, wherein the fake-information transmitting module transmits the fake input information to the information receiving address with the fake address.

13. A non-transitory computer readable storage medium with a computer program to execute a phishing processing method, wherein the phishing processing method comprises:
(a) receiving an information input web page and a plurality of emails, the information input web page comprising an information input interface through which information is transmitted to an information receiving address, and analyzing the emails to obtain a plurality of content addresses and determining which the content addresses are under the same at least one domain, counting a number of the content addresses which are under the same domains and determining the at least one same domain is a phishing domain if the number of the counted content addresses is more than a threshold;

(b) determining if the information input web page is a phishing web page, wherein the information input web page is the phishing web page if an address of the information input web page is under the phishing domain;

(c) if it is determined that the information input web page is the phishing web page, transmitting fake input information to the information receiving address;

(d) when information for verification is received from an information transmitting address, determining if the received information for verification is the fake input information; and (e) if the received information for verification is the fake input information, determining that the information transmitting address is a malicious address.

* * * * *